(12) United States Patent
Shepard et al.

(10) Patent No.: US 10,702,849 B2
(45) Date of Patent: Jul. 7, 2020

(54) NANO-RARE EARTH OXIDE DOPED SUPPORT FOR TRAPPING OF NOX AND/OR SOX

(71) Applicant: Pacific Industrial Development Corporation, Ann Arbor, MI (US)

(72) Inventors: David Shepard, South Lyon, MI (US); Christopher Zyskowski, Ann Arbor, MI (US); Jessica Brown, Canton, MI (US); Jeffery Lachapelle, Northville, MI (US); Wei Wu, Ann Arbor, MI (US)

(73) Assignee: Pacific Industrial Development Corporation, Ann Arbor, MI (US)

(*) Notice: Subject to any disclaimer, the term of this patent is extended or adjusted under 35 U.S.C. 154(b) by 0 days.

(21) Appl. No.: 16/430,916

(22) Filed: Jun. 4, 2019

(65) Prior Publication Data

US 2019/0381477 A1 Dec. 19, 2019

Related U.S. Application Data

(60) Provisional application No. 62/684,932, filed on Jun. 14, 2018.

(51) Int. Cl.

| | | |
|---|---|---|
| *B01J 20/08* | (2006.01) | |
| *B01J 20/06* | (2006.01) | |
| *B01J 20/28* | (2006.01) | |
| *B01J 23/72* | (2006.01) | |
| *B01J 23/745* | (2006.01) | |
| *B01J 23/75* | (2006.01) | |
| *B01J 21/06* | (2006.01) | |
| *B01J 35/02* | (2006.01) | |
| *B01J 35/10* | (2006.01) | |
| *B01J 35/04* | (2006.01) | |

(Continued)

(52) U.S. Cl.
CPC .............. *B01J 20/08* (2013.01); *B01D 53/04* (2013.01); *B01D 53/945* (2013.01); *B01J 20/06* (2013.01); *B01J 20/28016* (2013.01); *B01J 20/28059* (2013.01); *B01J 20/28061* (2013.01); *B01J 20/28071* (2013.01); *B01J 20/28073* (2013.01); *B01J 20/28076* (2013.01); *B01J 21/063* (2013.01); *B01J 21/066* (2013.01); *B01J 23/72* (2013.01); *B01J 23/745* (2013.01); *B01J 23/75* (2013.01); *B01J 35/026* (2013.01); *B01J 35/04* (2013.01); *B01J 35/1014* (2013.01); *B01J 35/1019* (2013.01); *B01J 35/1038* (2013.01); *B01J 35/1042* (2013.01); *B01J 35/1047* (2013.01); *B01D 2253/1124* (2013.01); *B01D 2253/25* (2013.01); *B01D 2253/306* (2013.01); *B01D 2253/311* (2013.01); *B01D 2255/20707* (2013.01); *B01D 2255/20715* (2013.01); *B01D 2255/20738* (2013.01); *B01D 2255/20746* (2013.01); *B01D 2255/20761* (2013.01); *B01D 2255/9155* (2013.01); *B01D 2255/9205* (2013.01); *B01D 2255/9207* (2013.01); *B01D 2257/302* (2013.01); *B01D 2257/404* (2013.01)

(58) Field of Classification Search
CPC ...... B01D 53/50; B01D 53/508; B01D 53/54; B01D 53/56; B01D 53/9413; B01D 53/8609; B01D 53/8625; B01D 53/8628; B01D 53/8637; B01D 2255/206; B01D 2257/302; B01D 2257/402; B01D 2257/404; B01D 2258/012; B01D 2258/0283; F01N 3/10; F01N 3/103; F01N 2570/04; F01N 2570/14; B01J 23/10; B01J 35/023
See application file for complete search history.

(56) References Cited

U.S. PATENT DOCUMENTS

| | | | | |
|---|---|---|---|---|
| 8,580,701 | B2* | 11/2013 | Adib | C01G 25/02 502/300 |
| 2003/0012707 | A1 | 1/2003 | Yamamoto et al. | |
| 2006/0228282 | A1* | 10/2006 | Zhou | A24B 15/28 423/239.1 |
| 2007/0014710 | A1* | 1/2007 | Gerlach | B01D 53/945 423/213.5 |
| 2007/0220873 | A1* | 9/2007 | Bosteels | B01D 53/9413 60/299 |
| 2009/0023581 | A1 | 1/2009 | Di Monte et al. | |
| 2009/0220698 | A1* | 9/2009 | Yadav | B82Y 30/00 427/383.5 |

(Continued)

FOREIGN PATENT DOCUMENTS

| | | | | |
|---|---|---|---|---|
| GB | 2553479 | A | | 3/2018 |
| GB | 2 553 479 | A | * | 7/2018 ............. C23C 16/40 |

OTHER PUBLICATIONS

Liu, Gang et al., "A Review of NOx Storage/Reduction Catalysts: Mechanism, Materials and Degradation Studies," Catalysis Science & Technology, 2011, 1, pp. 552-568.

*Primary Examiner* — Timothy C Vanoy
(74) *Attorney, Agent, or Firm* — Dickinson Wright PLLC

(57) ABSTRACT

An inorganic oxide material doped with nano-rare earth oxide particles that is capable of trapping one or more of $NO_x$ or $SO_x$ at a temperature that is less than 400° C. The nano-rare earth oxide particles have a particle size that is less than 10 nanometers. The catalyst support can trap at least 0.5% $NO_2$ at a temperature less than 350° C. and/or at least 0.4% $SO_2$ at a temperature less than 325° C. The catalyst support can trap at least 0.5% $NO_2$ and/or at least 0.2% $SO_2$ at a temperature that is less than 250° C. after being aged at 800° C. for 16 hours in a 10% steam environment. The catalyst support exhibits at least a 25% increase in capacity for at least one of $NO_x$ or $SO_x$ trapping at a temperature that is less than 400° C. when compared to a conventional rare earth doped support in a 10% steam environment.

20 Claims, 6 Drawing Sheets

(51) Int. Cl.
  *B01D 53/94* (2006.01)
  *B01D 53/04* (2006.01)

(56) References Cited

U.S. PATENT DOCUMENTS

2010/0111789 A1    5/2010  Fajardie
2010/0190640 A1*   7/2010  Nobukawa ......... B01D 53/9422
                                                     502/302
2015/0038325 A1*   2/2015  Ando ............... B01J 23/63
                                                     502/304

* cited by examiner

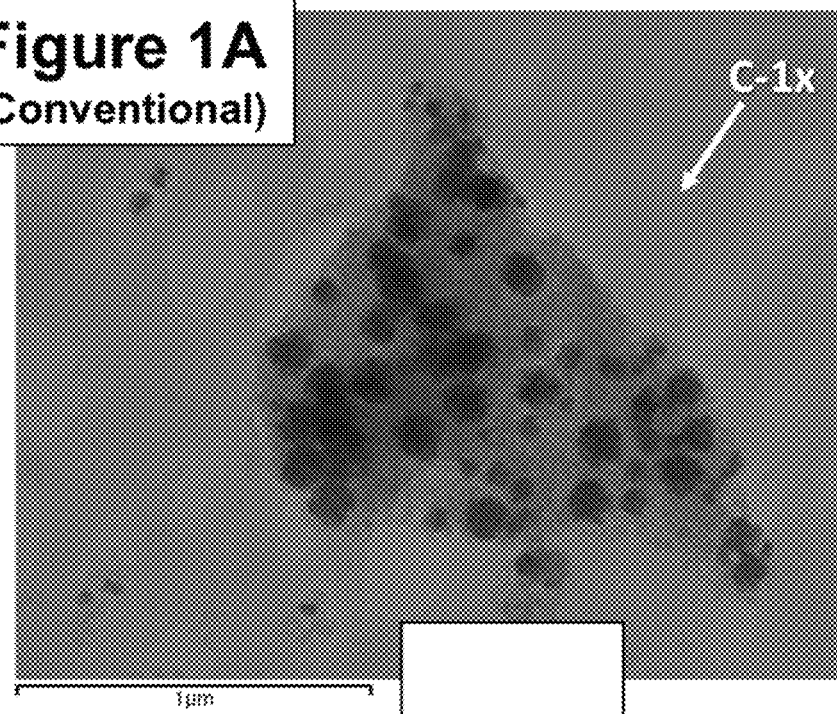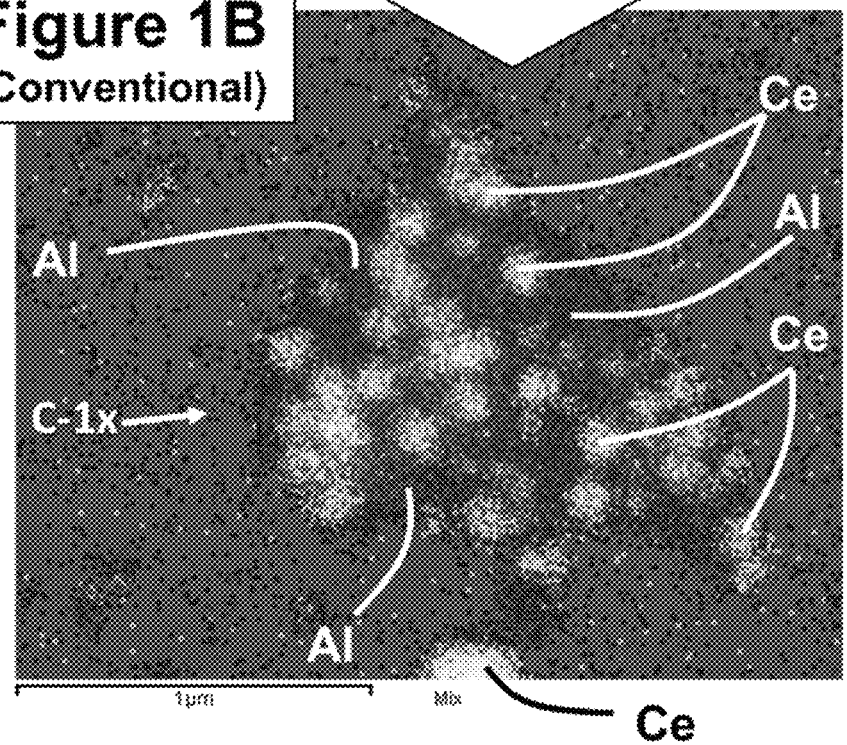

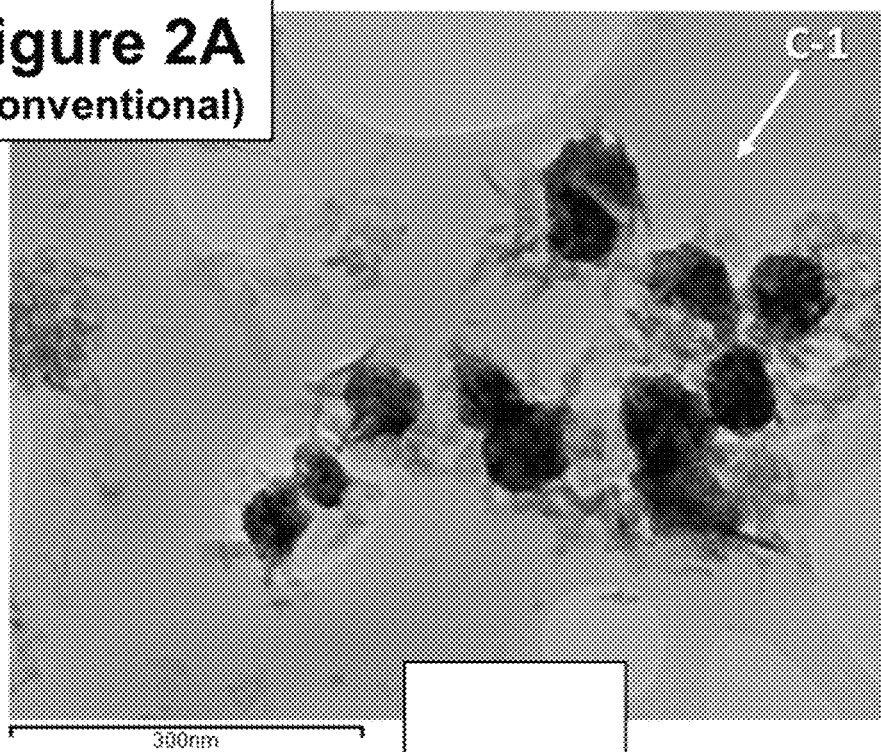
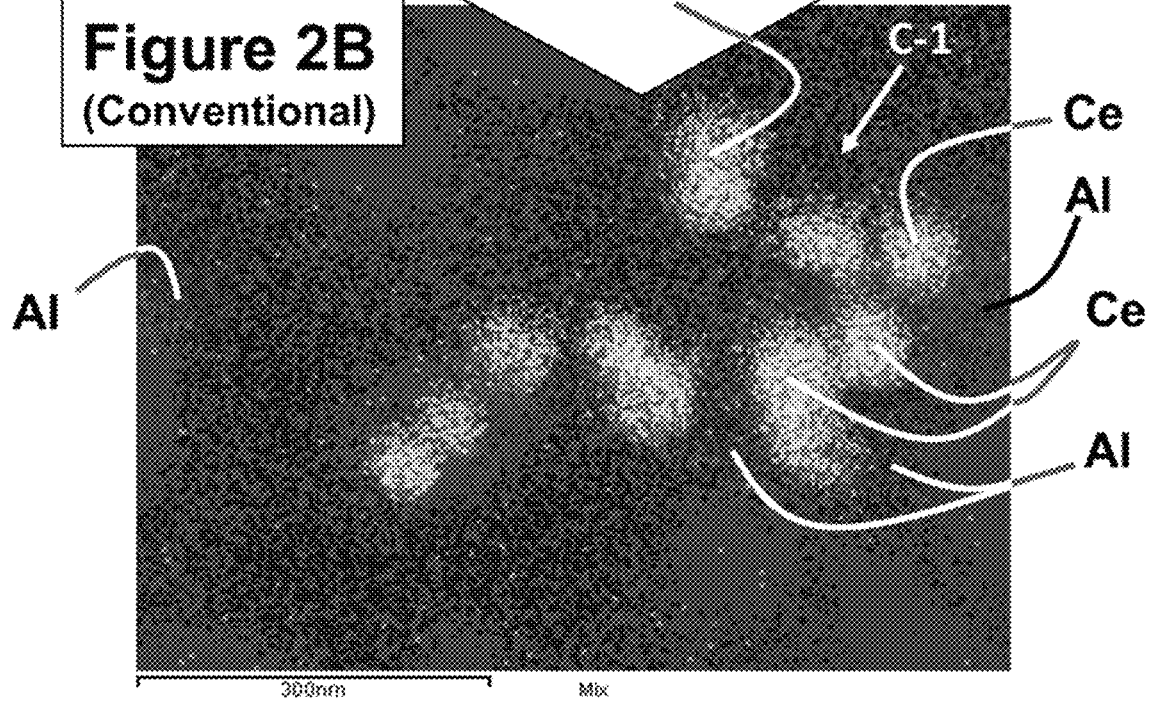

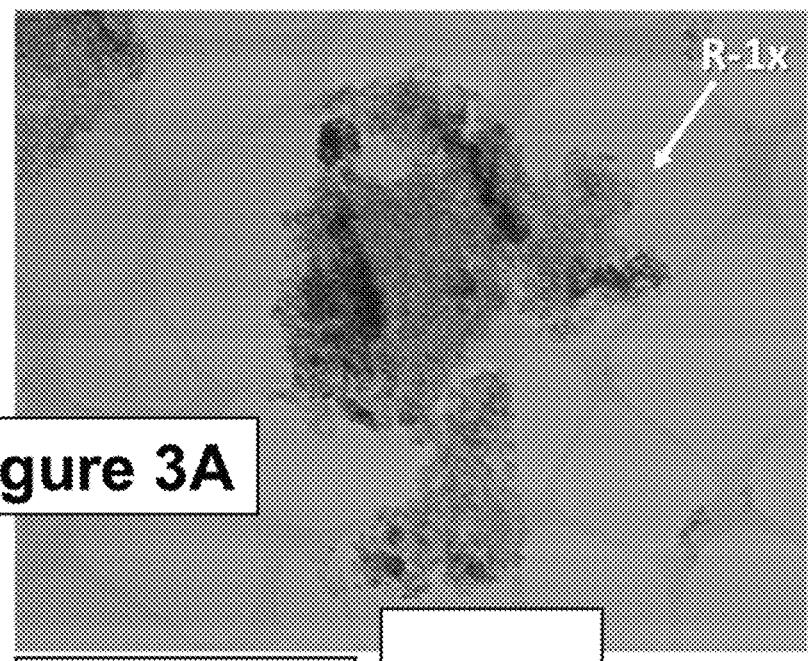
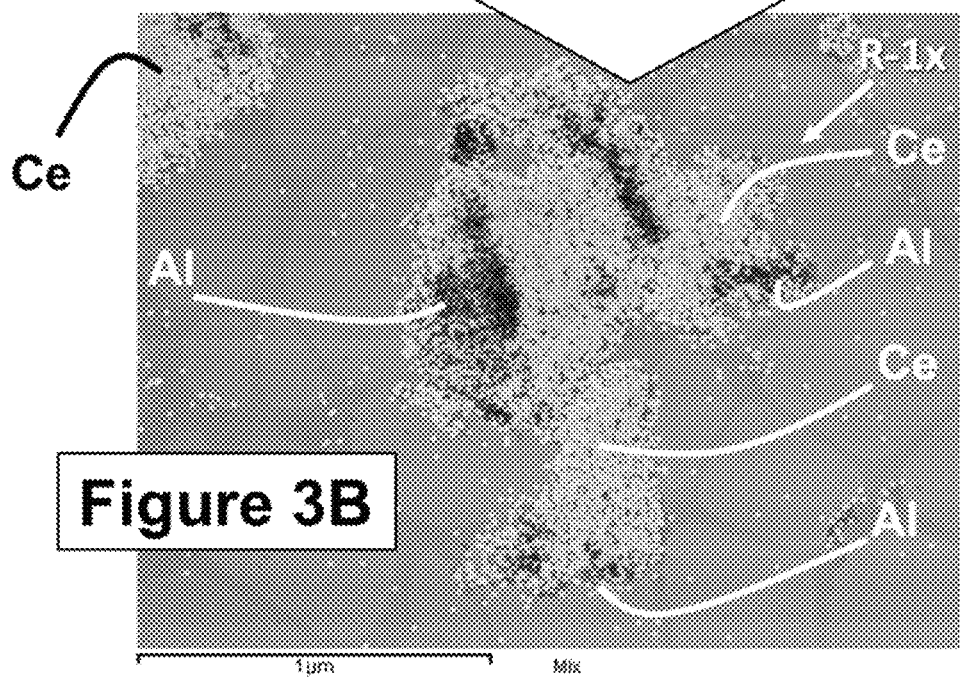

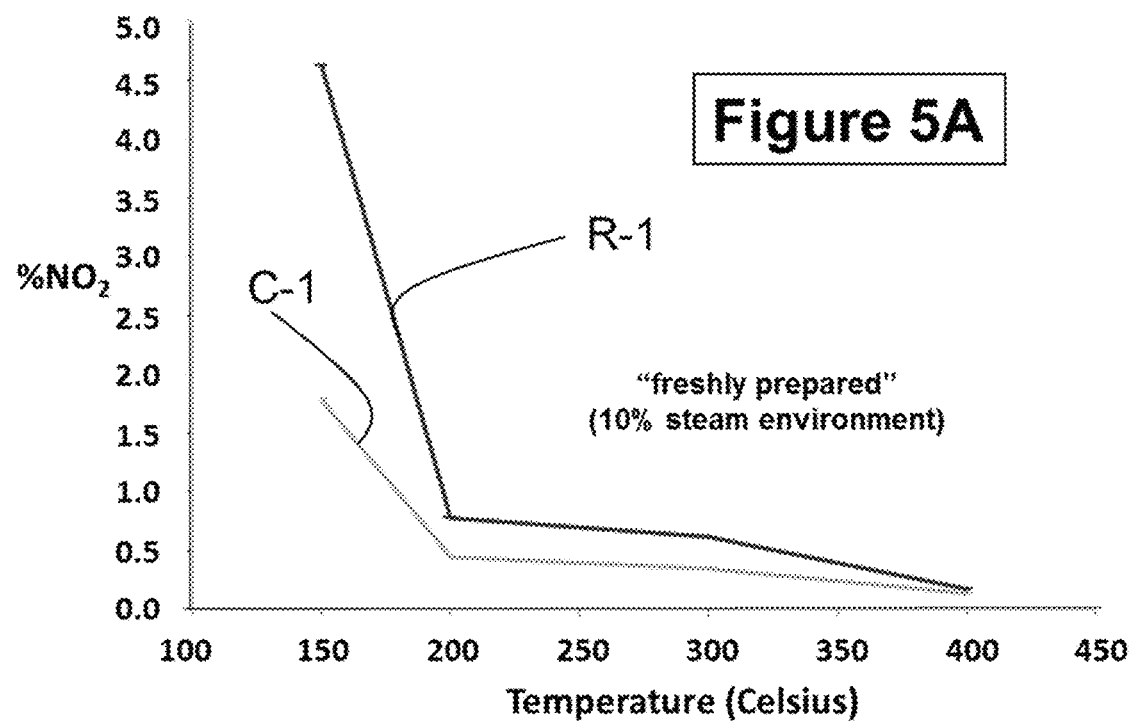
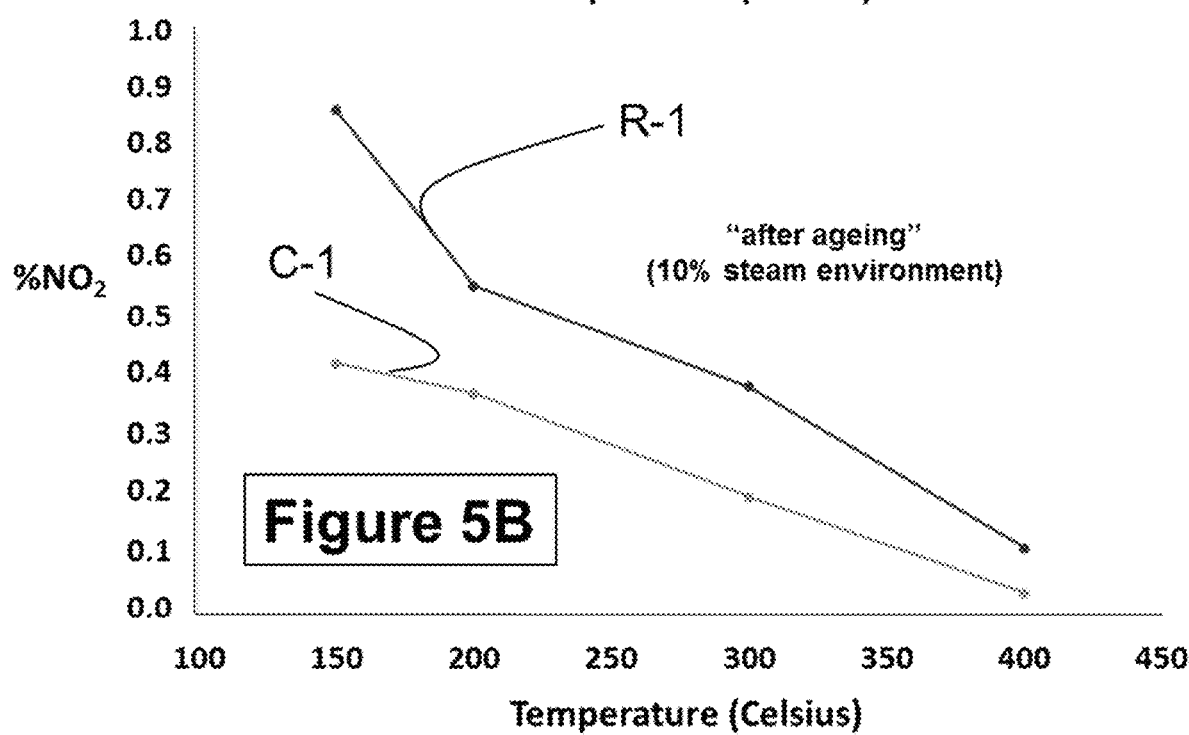

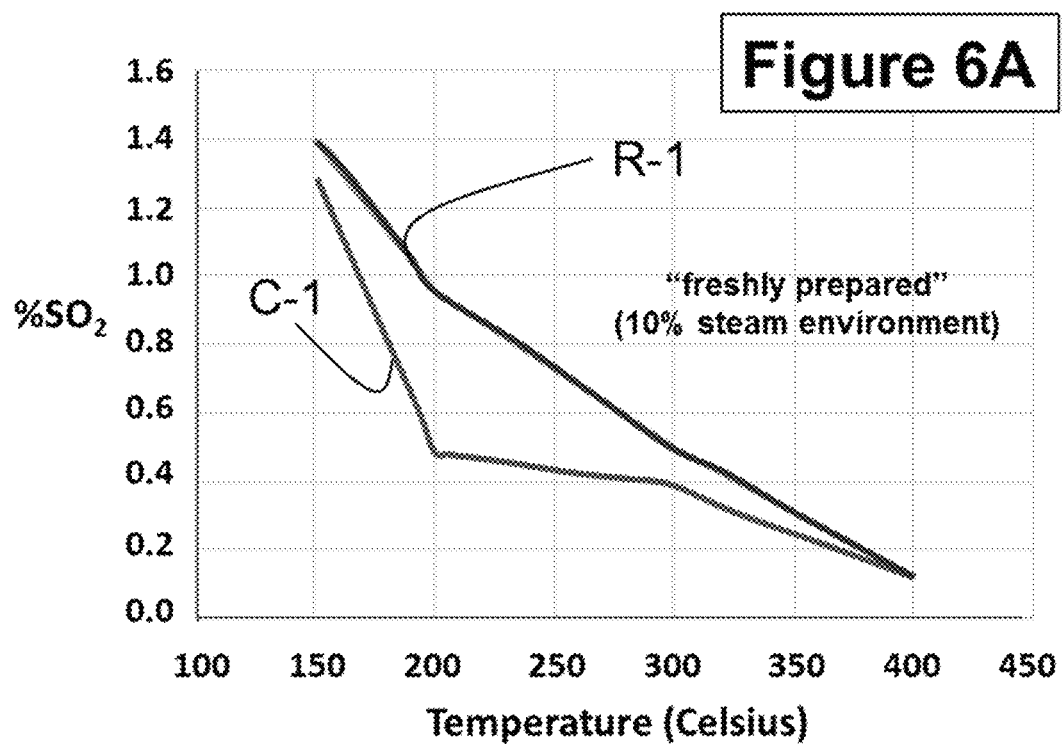
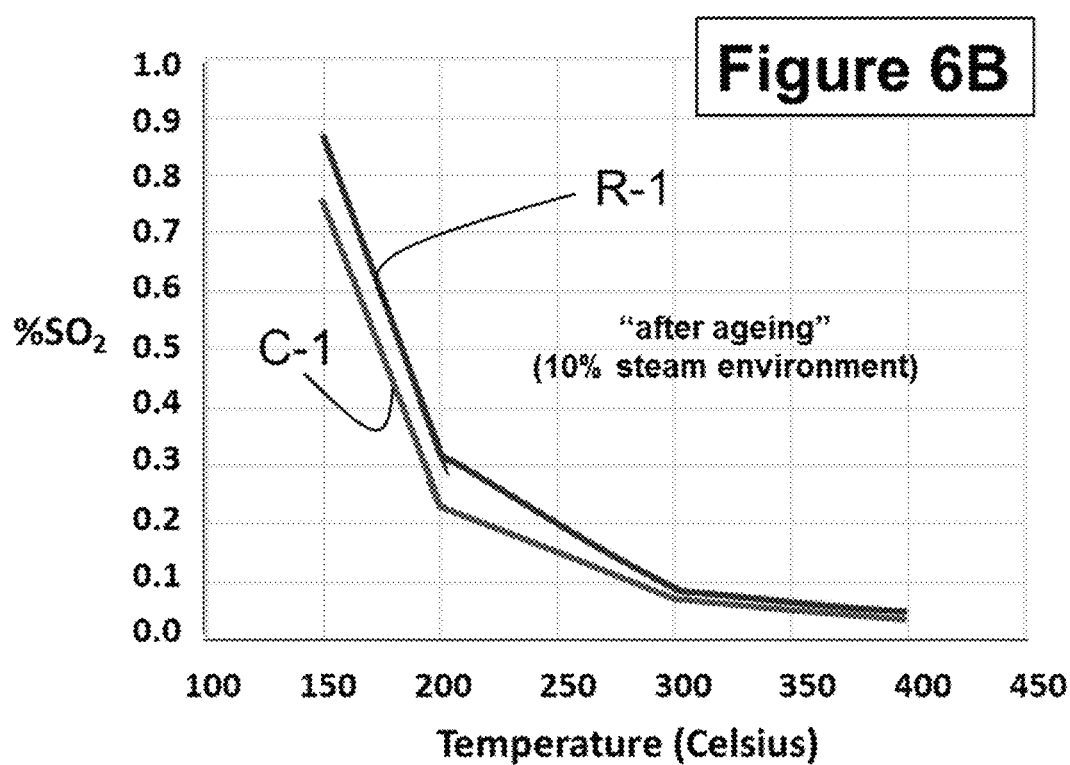

NANO-RARE EARTH OXIDE DOPED SUPPORT FOR TRAPPING OF NOX AND/OR SOX

CROSS REFERENCE TO RELATED APPLICATIONS

This application claims the benefit of the filing date under 35 U.S.C. § 119(e) of U.S. Provisional Application No. 62/684,932 filed Jun. 14, 2018, the entire contents of which is hereby incorporated herein by reference.

FIELD

This disclosure relates generally to oxide support materials used in catalytic applications. More specifically, these oxide support materials exhibit the ability to trap $NO_x$ and/or $SO_x$ emissions present in an exhaust gas stream.

BACKGROUND

The statements in this section merely provide background information related to the present disclosure and may not constitute prior art.

Various nitrogen oxides, such as nitric oxide (NO) and nitrogen dioxide ($NO_2$), which may be generally be referred to as $NO_x$, as well as sulfur oxides ($SO_x$), particulate matter (PM) and carbon dioxide ($CO_2$) represent the types of air pollution formed upon the combustion of hydrocarbon fuels. The nitrogen oxides ($NO_x$) are formed by the reaction of nitrogen and oxygen at the relatively high temperatures generated during the combustion process. The emission of sulfur oxides ($SO_x$) are due to the presence of various sulfur compound as impurities in the hydrocarbon fuel. The air pollution arising from fuel combustion contains gases that are hazardous to human health, as well as gases that have a greenhouse effect on the environment.

Selective catalytic reduction (SCR) and selective non-catalytic reduction (SNCR) reduce post combustion $NO_x$ by reacting the exhaust gases with urea or ammonia to produce nitrogen and water. SCR is now being used in many applications, including the treatment of exhaust gases in ships, diesel trucks and in some cars. The use of exhaust gas recirculation and catalytic converters in motor vehicle engines have significantly reduced vehicular emissions.

In addition, to the catalytic conversion of $NO_x$ and $SO_x$ gases to other compounds, current emission control technology also utilizes various active and passive absorbers to trap or bind $NO_x$ and/or $SO_x$. For example, $NO_x$ storage and reduction (NSR) catalysts are run cyclically under a lean environment (oxidizing) and rich environments (reducing) as determined by the corresponding ratio of air to fuel.

Global emission regulations are trending towards the decrease in allowable $NO_x$ emissions. Current and future regulations are decreasing the amount of allowable $NO_x$ emissions that may be present in an exhaust gas by 90% or more. Over 75% of the $NO_x$ emissions from the tail pipe of a vehicle result during cold start, which leads to a requirement of increased $NO_x$ trapping capacity over the catalyst activity without increasing the overall volume of the catalyst present. Thus, catalysts formed with or on oxide support materials that meet the requirements of these new regulations with enhanced capability for $NO_x$ or $SO_x$ trapping is desirable.

SUMMARY

This disclosure relates generally to a catalyst support that comprises an inorganic oxide material doped with nano-rare earth oxide particles, such that the catalyst support is capable of trapping one or more of $NO_x$ or $SO_x$ at a temperature that is less than 400° C. The nano-rare earth oxide particles may be oxides of Ce, Pr, Nd, La, Y, or a combination of thereof, while the inorganic oxide material comprises $Al_2O_3$, $ZrO_2$, $TiO_2$, $SiO_2$, $MgAl_2O_4$, or a combination thereof. The nano-rare earth oxide particles may have a particle size that is less than 10 nanometers (nm).

According to another aspect of the present disclosure, an exhaust gas treatment system comprises a metal-containing catalyst, wherein the metal-containing catalyst includes the catalyst support material described above and further defined herein along one or more metals. The one or more metals may be selected from the group of Cu, Fe, Co, Zr, Ti, or a mixture thereof. When desirable wherein at least a portion of a wall flow substrate may be coated with the metal-containing catalyst and adapted to make contact with the gas stream.

According to yet another aspect of the present disclosure, the catalyst support may be used to form a three-way catalyst, a four-way catalyst, a diesel oxidation catalyst, or an oxidation catalyst for treatment of vehicles exhaust gases.

According to still another aspect of the present disclosure a process for the reduction of nitrogen oxides or sulfur oxides contained in a gas stream in the presence of oxygen is provided. This process may generally comprise contacting the gas stream with the metal-containing catalyst as described above and further defined herein.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1A is an scanning electron micrograph of a conventional rare earth doped alumina support;

FIG. 1B is a transmission electron micrograph of the conventional support of FIG. 1A showing the location of cerium and aluminum in the support;

FIG. 2A is an scanning electron micrograph of the conventional rare earth doped alumina support of FIG. 1A at a higher magnification;

FIG. 2B is a transmission electron micrograph of the conventional support of FIG. 2A showing the location of cerium and aluminum in the support;

FIG. 3A is a scanning electron micrograph of a nano-rare earth doped alumina support formed according to the teachings of the present disclosure;

FIG. 3B is a transmission electron micrograph of the nano-rare earth support of FIG. 3A showing the location of cerium and aluminum in the support;

FIG. 5A is a graphical comparison of $NO_x$ trapping in a 10% steam environment for a fresh conventional rare earth doped support and a fresh nano-rare earth doped support prepared according to the present disclosure;

Figure 4A:
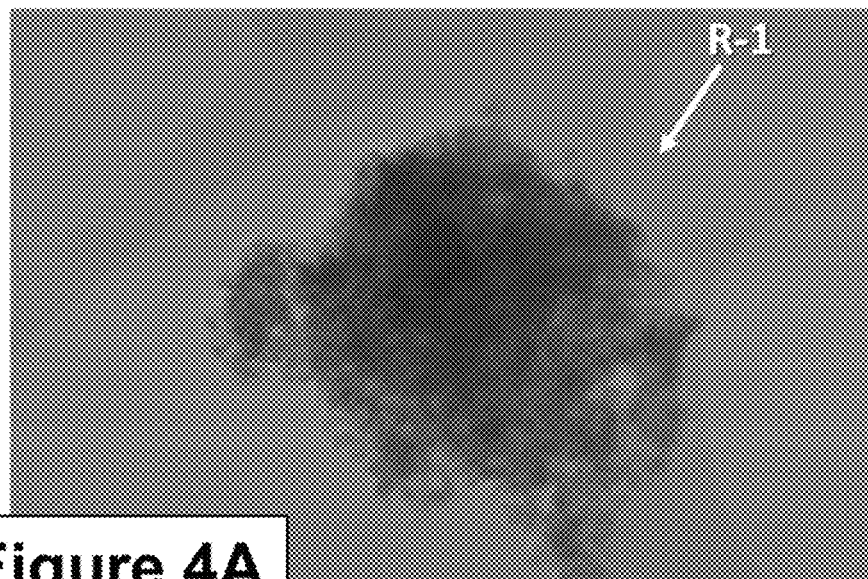
FIG. 4A is a scanning electron micrograph of the nano-rare earth doped alumina support of FIG. 3A at a higher magnification.

FIG. 5B is a graphical comparison of $NO_x$ trapping for a conventional rare earth doped support and a nano-rare earth doped support prepared according to the present disclosure after ageing at 800° C. for 16 hours in a 10% steam environment; and FIG. 6A is a graphical representation of $SO_x$ trapping in a 10% steam environment for a fresh conventional rare earth doped support and a fresh nano-rare earth doped support prepared according to the present disclosure; and FIG. 6B is a graphical comparison of $SO_x$ trapping for a conventional rare earth doped support and a nano-rare earth doped support prepared according to the present disclosure after ageing at 800° C. for 16 hours in a 10% steam environment.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the catalyst support made and used according to the teachings contained herein is described throughout the present disclosure in conjunction with a three-way catalyst (TWC) used to reduce vehicle emission gases in order to more fully illustrate the composition and the use thereof. The incorporation and use of such an OSM in other catalysts, such as four-way catalysts, diesel oxidation catalysts, and oxidation catalysts, or in other catalytic applications is contemplated to be within the scope of the present disclosure. It should be understood that throughout the description, corresponding reference numerals indicate like or corresponding parts and features.

Since over 75% of the $NO_x$ and/or $SO_x$ emissions arise from the exhaust of a vehicle under cold start conditions, catalysts and catalyst support materials must exhibit an increased capacity to trap the $NO_x$ and/or $SO_x$ emissions. The catalyst support of the present disclosure, addresses this problem by increasing the low to mid temperature trapping of $NO_x$ and/or $SO_x$ emissions by over 50% as compared to traditional technology and conventional support materials, without increasing the volume of the catalyst present.

The present disclosure generally provides a catalyst support that comprises, consists of, or consists essentially of an inorganic oxide material doped with nano-rare earth oxide particles. This catalyst support is capable of trapping one or more of $NO_x$ or $SO_x$ at a temperature that is less than 400° C.

The inorganic oxide material may be any type of oxide support material known to one skilled in the art to be capable of being used in a catalytic application. When desirable, the inorganic oxide material may be an oxide selected from the group of $Al_2O_3$, $ZrO_2$, $TiO_2$, $SiO_2$, $MgAl_2O_4$, or a combination thereof. Alternatively, the inorganic oxide material is $Al_2O_3$, $SiO_2$, BaO, or a combination thereof. Alternatively, the inorganic oxide material is a combination of $Al_2O_3$, $SiO_2$, and $ZrO_2$. Such combinations may be a result of simply mixing the different oxide materials together or integrating the different oxides into a shared skeletal structure, such as that formed by aluminosilicates, e.g., zeolites, or the like.

When desirable, the catalyst support may have an inorganic oxide content that ranges from about 20% to 99.9% by weight; alternatively, between about 30 wt. % and about 99 wt. %; alternatively, from about 40 wt. % to about 90 wt. %; alternatively, between about 50 wt. % and about 80 wt. %, relative to the overall weight of the catalyst support. The nano-rare earth oxide content in the catalyst support may also range from 0.1% to about 80% by weight; alternatively, between about 1 wt. % and about 70 wt. %; alternatively, from about 10 wt. % to about 60 wt. %; alternatively, between about 20 wt. % and about 50 wt. %.

According to another aspect of the present disclosure, the nano-rare earth oxide particles present in the catalyst support may be selected to include, but not be limited to, oxides of cerium (Ce), lanthanum (La), neodymium (Nd), praseodymium (Pr), yttrium (Y), or combination of thereof. These nano-rare earth oxide particles exhibit an average particle size (D50) that is less than about 10 nanometers (nm); alternatively, less than about 8 nanometers; alternatively between about 1 nanometers and about 10 nanometers. The largest particle size of the nano-rare earth oxides is measured to be about 50 nanometers; alternatively, less than 40 nanometers; alternatively, less than 25 nanometers; alternatively, less than 10 nanometers.

The catalyst support may exhibit a surface area that is in the range of about 25 $m^2$/g to about 500 $m^2$/g and a pore volume (PV) that is in the range of 0.05 cc/g to about 2.0 cc/g. Alternatively, the surface area exhibited by the catalyst support may be in the range of about 50 $m^2$/g to about 350 $m^2$/g; alternatively, about 100 $m^2$/g to about 200 $m^2$/g. Alternatively, the pore volume (PV) exhibited by the catalyst support may in the range of 0.1 cc/g to about 1.5 cc/g; alternatively, about 0.3 cc/g to about 1.0 cc/g.

Upon ageing, the catalyst support at 800° C. for about 16 hours in a 10% steam environment the surface area and the pore volume exhibited by the catalyst support may decrease from the values measured when the catalyst support is freshly prepared. However, after such aging the catalyst support still exhibits a surface area that is at least 25 $m^2$/g; alternatively, 50 $m^2$/g or greater, and a pore volume that is at least 0.1 cc/g; alternatively, 0.2 cc/g or greater.

Referring now to FIGS. 1A and 2A scanning electron microscopy (SEM) can be used to provide images of a conventional rare earth oxide support (C-1) with a magnification scale up to 1 micrometer (µm) or up to 300 nanometers (nm), respectively. This conventional support (C-1) represents a combination of cerium (Ce) oxide coated onto or impregnated with an aluminum (Al) oxide material. Conventional rare earth oxide supports may be prepared by any means known to one skilled in the art.

Transmission electron microscopy (TEM) may be used in conjunction with SEM to analyze the surface of the conventional rare earth oxide support (C-1) as shown in FIGS. 1B and 2B. The surface of these conventional supports generally contain a substantial amount of aluminum (Al) oxide with discrete pockets or areas upon which the cerium (Ce) oxide is dispersed.

The conventional rare earth oxide support (C-1) was prepared by impregnating a gamma alumina having a surface area of 200 $m^2$/g and pore volume of 1.0 cc/g with a cerium nitrate solution. More specifically, 70 grams of the gamma alumina was placed into a mixer and 100 grams of the cerium nitrate solution containing 30% $CeO_2$ content was sprayed onto the support. The support was mixed and dried at 120° C. for 12 hours followed by calcination at 600° C. for 4 hours. The resulting conventional support (C-1) was a cerium oxide doped gamma alumina support containing 30% cerium oxide.

Referring now to FIGS. 3A and 4A, scanning electron microscopy (SEM) is used to provide micrographs of a nano-rare earth oxide support (R-1) prepared according to the teachings of the present disclosure with a magnification scale up to 1 micrometer (μm) or up to 300 nanometers (nm), respectively. This catalyst support (R-1) represents a combination of cerium (Ce) oxide nanoparticles coated onto or impregnated with an aluminum (Al) oxide material. The rare earth oxide supports prepared according to the teachings of the present disclosure may be accomplished using any means known to one skilled in the art, including without limitation, co-precipitation and/or impregnation.

Figure 4B:
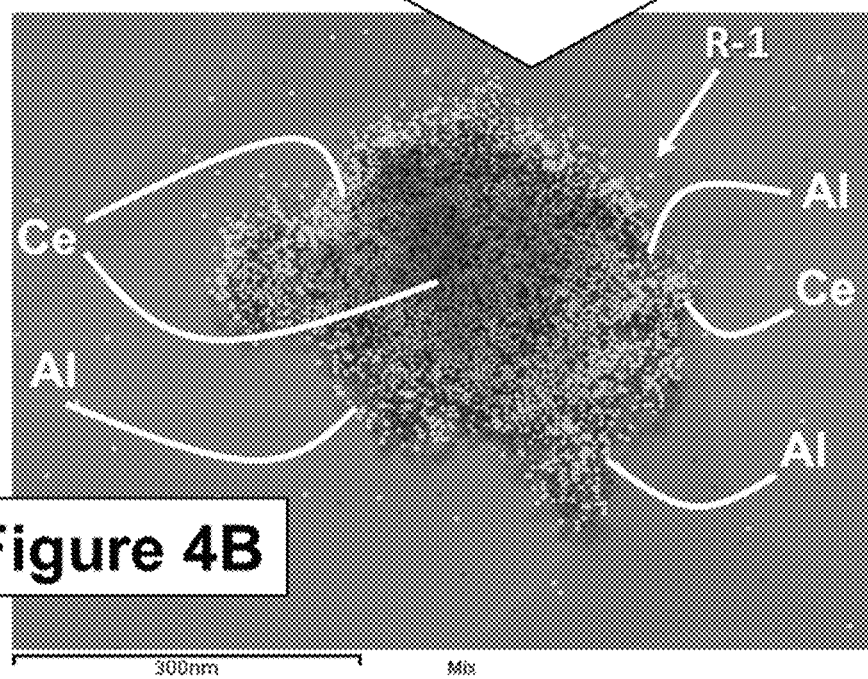
FIG. 4B is a transmission electron micrograph of the nano-rare earth support of FIG. 4A showing the location of cerium and aluminum in the support.

Transmission electron microscopy (TEM) may be used in conjunction with SEM to analyze the surface of the catalyst support (R-1) as shown in FIGS. 3B and 4B. The surface of these catalyst supports generally contain a substantial amount of cerium (Ce) oxide nanoparticles dispersed upon or impregnated within the aluminum (Al) oxide material.

The catalyst support (R-1) was prepared impregnating a gamma alumina having a surface area of 200 $m^2/g$ and pore volume of 1.0 cc/g with a colloidal cerium oxide solution. More specifically, 70 grams of the gamma alumina was placed into a mixer and 100 grams of the colloidal cerium oxide solution containing 30% $CeO_2$ content was sprayed onto the support. The support was mixed and dried at 120° C. for 12 hours followed by calcination at 600° C. for 4 hours. The resulting catalyst support (R-1) was a cerium oxide doped gamma alumina support containing 30% cerium oxide.

Referring now to FIGS. 5A and 6A, the amount of $NO_x$ and/or $SO_x$ that can be trapped by the catalyst support of the present disclosure (R-1) is compared against the amount trapped by a conventional rare earth doped oxide support (C-1). As shown in FIG. 5A, the catalyst support (R-1) can trap at least 0.5% $NO_2$ at a temperature that is less than about 350° C.; alternatively, between about 150° C. and about 350° C.; alternatively, between about 200° C. and 300° C., in a steam environment. As shown in FIG. 6A, the catalyst support (R-1) can trap at least 0.4% $SO_2$ at a temperature that is less than about 325° C.; alternatively, between about 150° C. and about 325° C., in a steam environment.

Still referring to FIGS. 5A and 6A, the amount of $NO_x$ and/or $SO_x$ that can be trapped by the catalyst support of the present disclosure (R-1) is greater than the amount trapped by a conventional rare earth doped support (C-1) over the same temperature range. In fact, the catalyst support (C-1) exhibits at least a 25% increase in capacity for at least one of $NO_x$ or $SO_x$ trapping at a temperature that is less than 400° C. when compared to a conventional rare earth doped support (C-1) in a 10% steam environment. Alternatively, the catalyst support (C-1) exhibits at least a 40% increase in capacity for at least one of $NO_x$ or $SO_x$ trapping at a temperature that is less than 350° C. when compared to a conventional rare earth doped support (C-1) in a 10% steam environment. Alternatively, the catalyst support (C-1) exhibits at least a 50% increase in capacity for at least one of $NO_x$ or $SO_x$ trapping at a temperature that is less than 325° C. when compared to a conventional rare earth doped support (C-1) in a 10% steam environment.

Referring now to FIGS. 5B and 6B, the catalyst support prepared according to the present disclosure may undergo a reduction in $NO_x$ and/or $SO_x$ trapping performance after being in use for a predetermined amount of time. However, as shown in FIG. 5B, the catalyst support (R-1) can still trap at least 0.5% $NO_2$ at a temperature that is less than 250° C. after being aged at 800° C. for 16 hours in a 10% steam environment. In addition, as shown in FIG. 6B the catalyst support (R-1) can still trap at least 0.2% $SO_2$ at a temperature that is less than 250° C. after being aged at 800° C. for 16 hours in a 10% steam environment.

Still referring to FIGS. 5B and 6B, the aged catalyst support (R-1) still exhibits an increased amount of trapping capability for $NO_x$ and/or $SO_x$ as compared to an aged conventional support (C-1). In fact, the catalyst support (R-1) exhibits at least a 10% increase in capacity for at least one of $NO_x$ or $SO_x$ trapping at a temperature that is less than 400° C. when compared to a conventional rare earth doped support (C-1) after aging at 800° C. for 16 hours in 10% steam environment. Alternatively, the catalyst support (R-1) exhibits at least a 20% increase in capacity for at least one of $NO_x$ or $SO_x$ trapping at a temperature that is less than 350° C. when compared to a conventional rare earth doped support (C-1) after aging at 800° C. for 16 hours in 10% steam environment. Alternatively, the catalyst support (R-1) exhibits at least a 30% increase in capacity for at least one of $NO_x$ or $SO_x$ trapping at a temperature that is less than 300° C. when compared to a conventional rare earth doped support (C-1) after aging at 800° C. for 16 hours in 10% steam environment.

For the purpose of this disclosure, the term "trapped" or "trapping" refers to the adsorption of $NO_x$ and/or $SO_x$ at the surface of the catalyst support; the absorption of $NO_x$ and/or $SO_x$ by the bulk of the catalyst support; or the occurrence of both. One skilled in the art will understand that after the $NO_x$ and/or $SO_x$ is trapped by the catalyst support that the catalyst support may be regenerated by the desorption of the $NO_x$ and/or $SO_x$ through the use of one or more mechanisms, including without limitation, a reaction with a hydrocarbon rich atmosphere to produce water and nitrogen.

According to another aspect of the present disclosure, the catalyst support can be used to form a three-way catalyst, a four-way catalyst, a diesel oxidation catalyst, or an oxidation catalyst for the treatment of a vehicle's exhaust gases. When the catalyst support is used in this fashion an exhaust gas treatment system is provided. This exhaust gas treatment system generally includes a metal-containing catalyst that comprises, consists of, or consists essentially of the catalyst support defined herein along with one or more metals. The metals present in the metal-containing catalyst may be a platinum group metal. When desirable, the metal may be selected, without limitation, from the group of copper (Cu), iron (Fe), nickel (Ni), cobalt (Co), manganese (Mn), zirconium (Zr), or titanium (Ti) or combination of thereof. Alternatively, the metals include one or more of Cu, Fe, Co, Zr, or Ti. The amount of the metal(s) present in the metal-containing catalyst may range from 0% up to 8% by weight; alternatively, from about 1 wt. % to about 7 wt. %; alternatively, from about 2 wt. % to about 5 wt. % with the remainder being the catalyst support.

The exhaust gas treatment system may be formed wherein at least a portion of a wall flow substrate, filter, or monolith is coated with the metal-containing catalyst and adapted to make contact with the gas stream. In this case, the metal-containing catalyst may be applied, without limitation, as a wash coating. When desirable, the wall flow substrate may comprise a honeycomb structure.

According to yet another aspect of the present disclosure, a process for the reduction of nitrogen oxides or sulfur oxides contained in a gas stream in the presence of oxygen is provided. This process generally comprises contacting the gas stream with the metal-containing catalyst as described above and as further defined herein.

For the purpose of this disclosure the terms "about" and "substantially" are used herein with respect to measurable values and ranges due to expected variations known to those skilled in the art (e.g., limitations and variability in measurements).

For the purpose of this disclosure, the term "weight" refers to a mass value, such as having the units of grams, kilograms, and the like. Further, the recitations of numerical ranges by endpoints include the endpoints and all numbers within that numerical range. For example, a concentration ranging from 40% by weight to 60% by weight includes concentrations of 40% by weight, 60% by weight, and all concentrations there between (e.g., 40.1%, 41%, 45%, 50%, 52.5%, 55%, 59%, etc.).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one metal", "one or more metals", and "metal(s)" may be used interchangeably and are intended to have the same meaning.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A catalyst support comprising an inorganic oxide material doped with nano-rare earth oxide particles having an average particle size ($D_{50}$) of less than 10 nanometers, such that the catalyst support is capable of trapping one or more of $NO_x$ or $SO_x$ at a temperature that is less than 400° C.;
   wherein the catalyst support exhibits a surface area in the range of 50 $m^2/g$ to about 350 $m^2/g$ as prepared, the surface area remaining at 50 $m^2/g$ or greater upon being aged at 800° C. for 16 hours in a 10% steam environment.

2. The catalyst support of claim 1, wherein the nano-rare earth oxide particles are oxides of Ce, Pr, Nd, La, Y, or a combination of thereof.

3. The catalyst support of claim 1, wherein the inorganic oxide material is $Al_2O_3$, $ZrO_2$, $TiO_2$, $SiO_2$, $MgAl_2O_4$, or a combination thereof.

4. The catalyst support of claim 1, wherein the nano-rare earth oxide particles is present in an amount that ranges from 0.1 wt. % up to about 80 wt. % and the inorganic oxide material is present in an amount that ranges from about 20 wt. % to about 99.9 wt. % of the overall weight of the catalyst support.

5. The catalyst support of claim 1, wherein the catalyst support exhibits a surface area that is in the range of about 100 $m^2/g$ to about 200 $m^2/g$.

6. The catalyst support of claim 1, wherein the catalyst support exhibits a pore volume that is in the range of 0.1 cc/g to about 1.5 cc/g.

7. The catalyst support of claim 6, wherein the catalyst support exhibits a pore volume that is in the range of about 0.3 cc/g to about 1.0 cc/g.

8. The catalyst support of claim 1, wherein the catalyst support exhibits a pore volume that is greater than 0.2 cc/g after aging at 800° C. for 16 hours in a 10% steam environment.

9. The catalyst support of claim 1, wherein the catalyst support can trap at least 0.5% $NO_2$ at a temperature between about 200° C. and about 350° C. and/or at least 0.4% $SO_2$ at a temperature between about 150° C. and about 325° C. in a 10% steam environment.

10. The catalyst support of claim 1, wherein the catalyst support can trap at least 0.5% $NO_2$ and/or at least 0.2% $SO_2$ at a temperature that is less than 250° C. after being aged at 800° C. for 16 hours in a 10% steam environment.

11. The catalyst support of claim 1, wherein the catalyst support exhibits at least a 25% increase in capacity for at least one of $NO_x$ or $SO_x$ trapping at a temperature that is less than 400° C. when compared to a conventional rare earth doped support in a 10% steam environment.

12. The catalyst support of claim 1, wherein the catalyst support exhibits at least a 20% increase in capacity for at least one of $NO_x$ or $SO_x$ trapping at a temperature that is less than 350° C. when compared to a conventional rare earth doped support after aging at 800° C. for 16 hours in 10% steam environment.

13. The use of the catalyst support of claim 1 in a three-way catalyst, a four-way catalyst, a diesel oxidation catalyst, or an oxidation catalyst for treatment of a vehicle's exhaust gases.

14. The catalyst support of claim 1, wherein the nano-rare earth oxide particles further comprise a largest particle size of 50 nanometers.

15. The catalyst support of claim 1, where the nano-rare earth oxide particles have an average particle size ($D_{50}$) of less than 8 nanometers and a largest particle size that is less than 40 nanometers.

16. The catalyst support of claim 1, wherein the inorganic oxide material is $Al_2O_3$, $SiO_2$, BaO, or a combination thereof.

17. An exhaust gas treatment system that includes a metal-containing catalyst, wherein the metal-containing catalyst comprises the catalyst support material of claim 1 and one or more metals.

18. The exhaust gas treatment system of claim 17, wherein the metal is selected from the group of Cu, Fe, Co, Zr, Ti, or a mixture thereof.

19. The exhaust gas treatment system of claim 17, wherein at least a portion of a wall flow substrate is coated with the metal-containing catalyst and adapted to make contact with the gas stream.

20. A process for the reduction of nitrogen oxides or sulfur oxides contained in a gas stream in the presence of oxygen wherein said process comprises contacting the gas stream with the metal-containing catalyst of claim 17.

* * * * *